(12) United States Patent
Nagashima

(10) Patent No.: US 6,598,170 B1
(45) Date of Patent: Jul. 22, 2003

(54) POWER SUPPLY CONTROL BASED ON PRESET SCHEDULE WITH INDEPENDENT SCHEDULE MONITOR AND BACKUP SYSTEM FOR EXECUTING SCHEDULE OPERATION WHEN MALFUNCTION OCCURS

(75) Inventor: Tetsuro Nagashima, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/488,679

(22) Filed: Jan. 21, 2000

(30) Foreign Application Priority Data

Feb. 26, 1999 (JP) ............................. 11-051738

(51) Int. Cl.[7] ................................ G06F 1/28
(52) U.S. Cl. ......................... 713/340; 714/22
(58) Field of Search ................... 307/64; 713/340, 713/310; 700/292; 714/22

(56) References Cited

U.S. PATENT DOCUMENTS 5,542,035 A * 7/1996 Kikinis et al. ............... 713/323
5,793,124 A * 8/1998 Mitzaki ....................... 307/66
5,815,652 A * 9/1998 Ote et al. ..................... 709/224
5,828,140 A * 10/1998 Shih ............................ 307/18
5,982,652 A * 11/1999 Simonelli et al. ............ 363/142
6,189,106 B1 * 2/2001 Anderson .................... 713/300

FOREIGN PATENT DOCUMENTS

| JP | 55-49722 A | 4/1980 |
|---|---|---|
| JP | 61-29924 A | 2/1986 |
| JP | 61-195418 | 8/1986 |
| JP | 5-224768 A | 9/1993 |
| JP | 6-202764 | 7/1994 |
| JP | 7-245886 A | 9/1995 |
| JP | 10-214138 A | 8/1998 |

* cited by examiner

Primary Examiner—Thomas Lee
Assistant Examiner—Albert Wang
(74) Attorney, Agent, or Firm—Staas & Halsey LLP

(57) ABSTRACT

In a power supply apparatus, a microprocessor automatically performs a stop/restart of power supply to a computer on the basis of a command/parameters input by the computer. A schedule operation monitor circuit monitors whether the schedule operation is normally performed. A microprocessor control unit forcibly executes the schedule operation to perform automatic restoration on the basis of a monitor result of the schedule operation monitor circuit when abnormality occurs in the schedule operation.

13 Claims, 7 Drawing Sheets

FIG.4

|   | C1 | C2 | C3 | C4 | C5 | C6 | STATE OF UNINTERRUPTIBLE POWER SUPPLY 10 |
|---|----|----|----|----|----|----|------|
| ① | 0 | 0 | 0 | 0 | 0 | on | NORMAL |
| ② | 0 | 0 | 0 | 1 | 0 | on | ABNORMAL (ABNORMAL SHUT DOWN SIGNAL) |
| ③ | 0 | 0 | 1 | 0 | 0 | on | ABNORMAL (ABNORMAL COUNTER) |
| ④ | 0 | 0 | 1 | 1 | 0 | on | ABNORMAL (ABNORMAL DECODER SIGNAL) |
| ⑤ | 0 | 1 | 0 | 0 | 0 | on | ABNORMAL (not-OFF ABNORMALITY) |
| ⑥ | 0 | 1 | 0 | 1 | 1 | off | NORMAL |
| ⑦ | 0 | 1 | 1 | 0 | 0 | on | NORMAL |
| ⑧ | 0 | 1 | 1 | 1 | 0 | on | ABNORMAL (not-ON ABNORMALITY) |
| ⑨ | 1 | — | — | 0 | 0 | on | REMOTE ON |
| ⑩ | 1 | — | — | 1 | 1 | off | REMOTE OFF |

POWER SUPPLY CONTROL BASED ON PRESET SCHEDULE WITH INDEPENDENT SCHEDULE MONITOR AND BACKUP SYSTEM FOR EXECUTING SCHEDULE OPERATION WHEN MALFUNCTION OCCURS

FIELD OF THE INVENTION

The present invention relates to a power supply apparatus for supplying a stabilized voltage (constant voltage/constant frequency), a power supply control apparatus, a power supply control apparatus, and a schedule operation monitor control method for a power supply system. More particularly, this invention relates to a power supply apparatus having a monitor control function for schedule operation in which stop and restart of power supply to a load is automatically performed on the basis of a preset schedule, a power supply control apparatus, and a schedule operation monitor control method for a power supply system.

BACKGROUND OF THE INVENTION

Conventionally, a UPS (Uninterruptible Power Supply) for supplying a stabilized voltage having a constant voltage/constant frequency is used for a load such as a computer or a communication device which requires very high reliability. The uninterruptible power supply mainly has a function of shaping the waveform of a commercial AC power to supply the power to the load as a stabilized voltage and a function of uninterruptible generating a stabilized voltage from a battery in power outage (power interruption) to supply the stabilized voltage to the load. In this manner, the uninterruptible power supply supplies a stabilized voltage to a load without being influenced by variations in voltage/frequency of a commercial power supply, and its importance increases with rapid development of recent computers and networks. In recent years, in addition to the basic functions described above, a schedule operation function in which a power supply to a load is automatically stopped and restarted is added to an uninterruptible power supply. On the other hand, when maintaining the uninterruptible power supply, in order to always supply a stabilized voltage to a highly reliable load, it is the most important problem how rapidly investigates the cause after a trouble occurs and how to cope with the trouble.

A voltage variation, a frequency variation, and power outage (especially, interruption) occurring in a commercial power supply give very serious damages such as system down, an erroneous operation, and data breakdown to the highly reliable loads of computers (server, various computer terminals, and the like), and the like, peripheral devices (magnetic disk devices, photomagnetic disk devices, printers and the like), and communication devices (exchangers, multiplexing devices, modems, and the like). Therefore, in a conventional art, an uninterruptible power supply is interposed between a commercial power supply and a highly reliable load to supply a stabilized voltage having a constant voltage/constant frequency from the uninterruptible power supply to the highly reliable load.

FIG. 7 is a block diagram showing the configuration of a conventional uninterruptible power supply 1. The uninterruptible power supply 1 shown in FIG. 7 shapes the waveform of a commercial AC voltage (AC) input to the power supply input unit 2, and then supplies the voltage to a not shown computer (the highly reliable load). The uninterruptible power supply 1 has a schedule operation function of automatically stopping/restarting power supply to the computer according to a preset schedule.

In the uninterruptible power supply 1, a not shown charger (AC/DC converter) charges a battery 4 in an uninterruptible state, and the battery 4 supplies a DC voltage to a not shown DC/AC converter when power outage (interruption) occurs. In the DC/AC converter, a DC voltage from the battery 4 is converted into a stabilized voltage. An uninterruptible switch 5 is turned on to the power supply input unit 2 side in an uninterruptible state, and the uninterruptible switch 5 is uninterruptedly turned on to the battery 4 side when power outage occurs. More specifically, the uninterruptible switch 5 is uninterruptedly switched from a commercial AC voltage to a backup input obtained by the battery 4 when power outage occurs.

An output switch 6 is a switch for turning on/off a power supply from the uninterruptible power supply 1 to the computer, and is ON/OFF-controlled by a microprocessor 9. In this case, a commercial AC voltage input through the power supply input unit 2 and the uninterruptible switch 5 is converted into a stabilized voltage having a constant voltage/constant frequency in a not shown waveform shaping circuit. This stabilized voltage is then supplied to the computer through a power supply line 7, the output switch 6, the power supply output unit 3, and a not shown power supply line. On the other hand, when power outage occurs, a DC voltage from the battery 4 is converted into an AC voltage by a not shown DC/AC converter, and the AC voltage is supplied to the computer through the power supply line 7, the output switch 6, and the power supply output unit 3 as a stabilized voltage of fixed voltage and fixed frequency.

A receiver/driver 8 is connected to the computer through a not shown communication line, and has a function of receiving a command and parameters input by the computer and the function as communication driver. In this case, the command and the parameters are related to the schedule operation explained above. More specifically, an instruction text for performing a schedule operation is used as the command, and power supply stop time, power supply restart time, and a schedule operation time (power supply restart time-power supply stop time) in the schedule operation are used as the parameters. The microprocessor 9 controls the respective parts of the apparatus. In the example shown in FIG. 7, the output switch 6 in the schedule operation is ON/OFF-controlled according to the command and the parameters.

More specifically, the microprocessor 9 executes the schedule operation by a command. When it is power supply stop time designated by parameters, the microprocessor 9 outputs a shut down signal to the output switch 6 to turn off the output switch 6 form ON state. On the other hand, it is power supply restart time designated by the parameters, the microprocessor 9 stops outputting of a shut down signal to turn on the output switch 6 from OFF state. In this manner, in the schedule operation, power supply to the computer is controlled under the control of the microprocessor 9 according to a schedule preset by the command and the parameters.

In the configuration explained above, in an ordinary operation, the uninterruptible switch 5 is turned on to the power supply input unit 2 side, and the output switch 6 is turned on. A commercial AC voltage input through the power supply input unit 2 and the uninterruptible switch 5 is converted into a stabilized voltage of fixed voltage and fixed frequency by a not shown waveform shaping circuit. The stabilized voltage is supplied to the computer through the power supply line 7, the output switch 6, the power supply output unit 3, and the not shown power supply line. When the power outage occurs, the uninterruptible switch 5 is uninterruptedly switched on to the battery 4. Stabilized voltage of fixed voltage and fixed frequency is then supplied from the battery 4 to the computer. Therefore, even if power outage occurs, a subsequent stabilized voltage is continuously supplied after power outage.

When the schedule operation is to be executed, a command and parameters output from an in-operation computer in advance are received in advance by the receiver/driver 8 of the uninterruptible power supply 1 through a not shown communication line, and then received by the microprocessor 9. In this manner, the microprocessor 9 analyses the command and the parameters to set power supply time and power supply restart time in the schedule operation. In this case, the schedule operation is executed to achieve power saving, power economizing, or the like by automatically stopping feeding power at no use time zone of the computer (for instance, midnight).

When a time measurement result of a not shown timer built in the microprocessor 9 becomes power supply stop time, the microprocessor 9 outputs a shut down signal to the output switch 6. In this manner, the output switch 6 in an ON state is turned off, and outputting of a stabilized voltage from the power supply output unit 3 is stopped, so that power supply to the computer is stopped. When a schedule operation time set by the schedule has passed, the time measurement result of the timer is power supply restart time. For this reason, the microprocessor 9 stops outputting of the shut down signal. Therefore, the output switch 6 in an OFF state is turned on, and outputting of a stabilized voltage from the power supply output unit 3 is restarted, so that power supply to the computer is restarted. In this manner, in the conventional uninterruptible power supply 1, power supply is automatically stopped/restarted according to the schedule set by the computer.

As has been explained above, in the conventional uninterruptible power supply 1, the schedule operation is controlled by the microprocessor 9 according to the schedule set by the command and the parameters. However, when a command process in the microprocessor 9 is not correctly executed, or when parameters related to power supply stop time/restart time disappears by some causes, a trouble that a schedule operation cannot be correctly executed occurs. Therefore, in this case, an operation of the computer (the highly reliable load) is enormously affected.

Further, after such a trouble occurs, it is necessary to investigate the cause of the trouble occurrence, and do an appropriate action. In this action against the trouble, information such as the presence/absence of reception of a command/parameters or schedule stop time is a valid trace of investigating the cause. However, in the conventional uninterruptible power supply 1, since the command and the parameters are processed by the microprocessor 9 at once, the command and the parameters may be disappears by a malfunction of the microprocessor 9. Therefore, if a trouble (non-execution of the schedule operation) occurs due to the disappearance of the command and the parameters, it is not able to know the command and the parameters which are traces of investigating the cause.

In addition, in the conventional uninterruptible power supply 1 described above, when an abnormality that outputting of a shut down signal is stopped by any malfunction before power supply restart time in a schedule operation, the abnormality occurrence time or a command at this time does not remain as history. In this manner, in the conventional uninterruptible power supply 1, when important information (abnormality occurrence time, a command, parameters, and the like) for an action against trouble after an abnormality related to the schedule operation occurs cannot be obtained, an effective investigation of the cause cannot be advanced by using the information as a trace. Therefore, a long time is inevitably required for the action against trouble.

SUMMARY OF THE INVENTION

The present invention has been made in light of the problems described above. It is an object to provide a power supply apparatus capable of canceling a malfunction in a schedule operation and capable of rapidly making an action against trouble related to the schedule operation, a power supply control apparatus, and a schedule operation monitor control method for a power supply system.

According to one aspect of the present invention, in a power supply apparatus, a schedule operation monitor unit monitors whether an abnormality has occurred in a scheduled operation, and when it is detected that the abnormality has occurred an automatic restoration unit executes the schedule operation in place of a schedule operation control unit. Therefore, if an abnormality occurs, a malfunction in the schedule operation can be canceled without adversely affecting a load.

Further, even if an abnormality occurs, the load is not adversely affected by an operation of the automatic restoration unit, and an abnormal log in occurrence of the abnormality is recorded on a recording unit. Thus, in an action against trouble after the abnormality occurs, the abnormal log is extracted from the recording unit, and the cause for the abnormality can be investigated on the basis of the abnormal log. Therefore, the action against trouble can be rapidly made.

According to another aspect of the present invention, in a power supply control apparatus, a schedule operation monitor unit monitors whether an abnormality has occurred in a scheduled operation, and when it is determined that the abnormality has occurred an automatic restoration unit executes the schedule operation in place of a schedule operation control unit. Therefore, if an abnormality occurs, a malfunction in the schedule operation can be canceled without adversely affecting a load.

Further, even if an abnormality is generated, the load is not adversely affected by an operation of the automatic restoration unit, and an abnormal log in occurrence of an abnormality is recorded on a recording unit. Thus, the abnormal log is extracted from the recording unit in an action against trouble after the abnormality occurs, and the cause for the abnormality can be investigated on the basis of the abnormal log. Therefore, the action against trouble can be rapidly made.

According to still another aspect of the present invention, in a power supply apparatus, a schedule operation monitor unit monitors whether an abnormality has occurred in a scheduled operation, and when it is determined that the abnormality has occurred then an abnormal log is recorded on a recording unit. Thus, the abnormal log is extracted from the recording unit in an action against trouble after the abnormality occurs, and the cause for the abnormality can be investigated on the basis of the abnormal log. Therefore, the action against trouble can be rapidly made.

Further, with reference to the data related to the schedule held by a holding unit, in an action against trouble after an abnormality occurs, classification depending on whether the abnormality is caused by the schedule operation can be easily performed. Therefore, the action against trouble can be rapidly made.

According to still another aspect of the present invention, in a power supply control apparatus, a schedule operation monitor unit monitors whether an abnormality has occurred in a scheduled operation, and when it is determined that the abnormality has occurred then an abnormal log is recorded on a recording unit. Thus, the abnormal log is extracted from the recording unit in an action against trouble after the abnormality occurs, and the cause for the abnormality can be investigated on the basis of the abnormal log. Therefore, the action against trouble can be rapidly made.

Further, with reference to the data related to the schedule held by a holding unit, in an action against trouble after an abnormality occurs, classification depending on whether the abnormality is caused by the schedule operation can be easily performed. Therefore, the action against trouble can be rapidly made.

According to still another aspect of the present invention, in a schedule operation monitor control method, a schedule operation monitor step is provided in which it is monitored whether an abnormality has occurred in a scheduled operation, and when it is determined that the abnormality has occurred then an automatic restoration step of executing the schedule operation is provided in place of executing a schedule operation control step. Therefore, if the abnormality occurs, a malfunction in the schedule operation can be canceled without adversely affecting the load.

According to still another aspect of the present invention, in a schedule operation monitor control method, in a schedule operation monitor control method, a schedule operation monitor step is provided in which it is monitored whether an abnormality has occurred in a scheduled operation, and when it is determined that the abnormality has occurred then an abnormal log is recorded. Thus, in an action against trouble after the abnormality occurs, the cause for the abnormality can be investigated on the basis of the abnormal log. Therefore, the action against trouble can be rapidly made.

Other objects and features of this invention will become apparent from the following description with reference to the accompanying drawings.

BRIEF DESCRIPTION OF THE DRAWINGS

FIG. 4 is a truth table of outputs of the uninterruptible power supply 10 shown in FIG. 1;

DESCRIPTION OF THE PREFERRED EMBODIMENTS

A power supply apparatus, a power supply control apparatus, and a schedule operation monitor control method for a power supply system according to the present invention will be explained below with reference to the drawings. In embodiments 1 and 2, uninterruptible power supplies will be explained below as one example of the power supply apparatus, the power supply control apparatus, and the power supply system.

Figure 1:
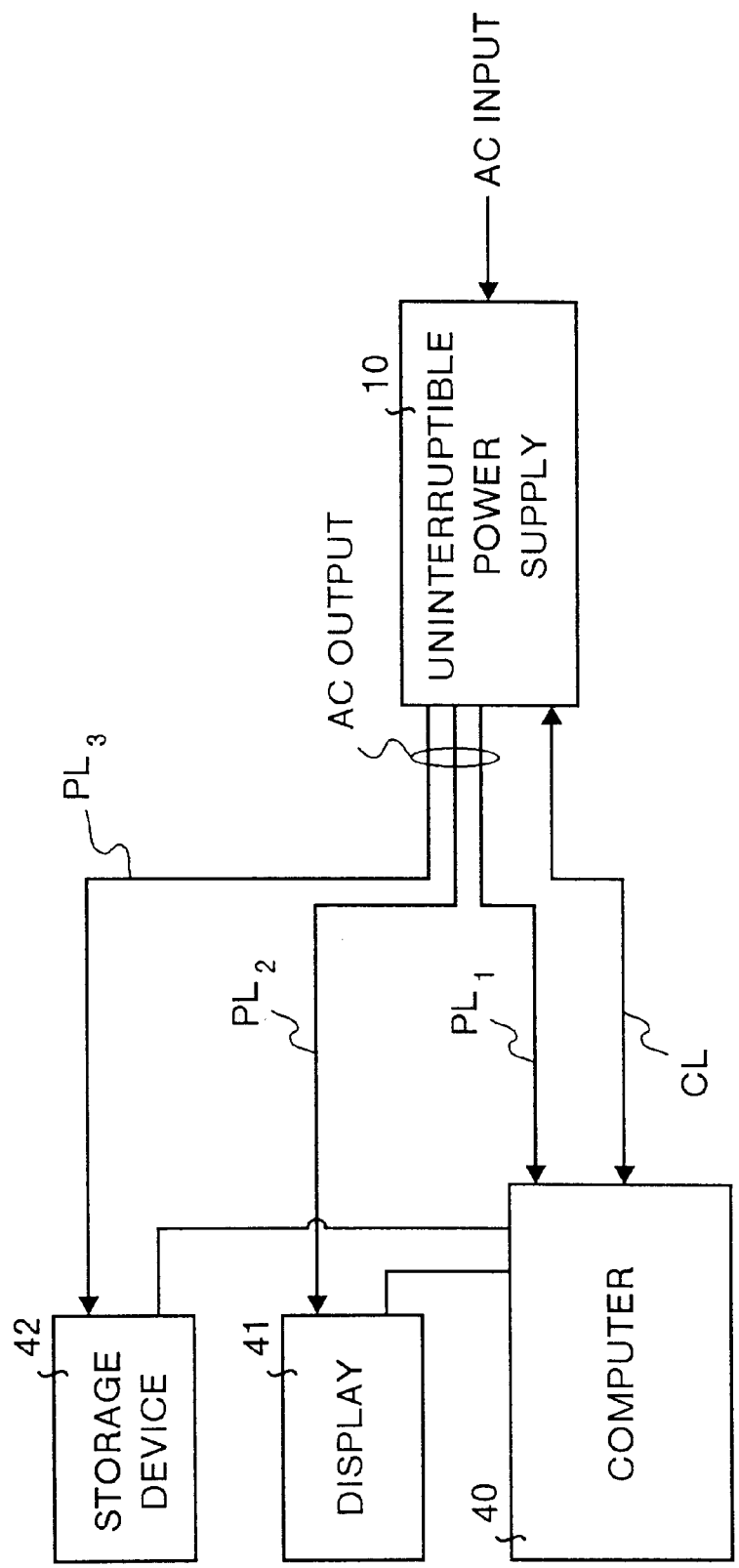
FIG. 1 is a block diagram showing an application of an uninterruptible power supply 10 according to a first embodiment of the present invention.
Figure 7:
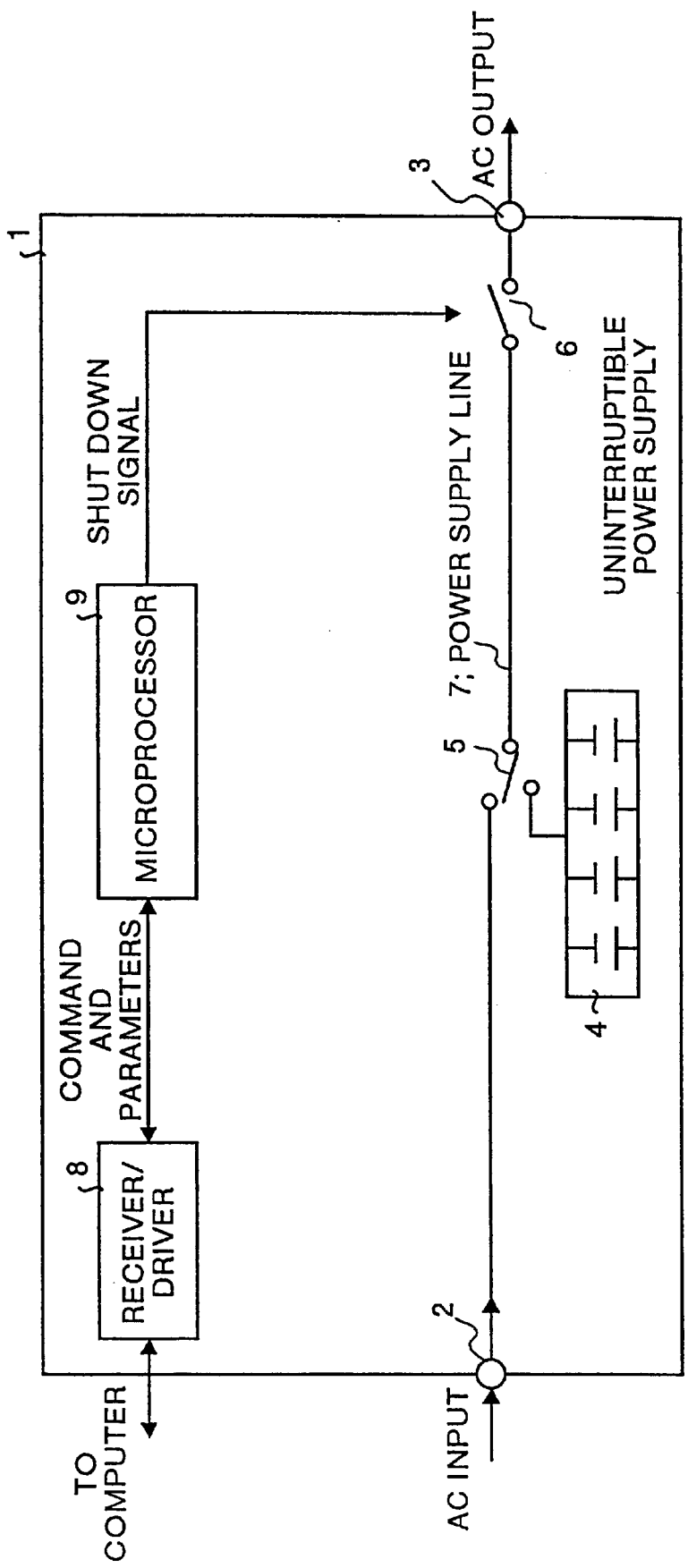
FIG. 7 is a block diagram showing the configuration of a conventional uninterruptible power supply 1.

FIG. 1 is a block diagram showing an application of an uninterruptible power supply 10 according to a first embodiment of the present invention. In FIG. 1, the uninterruptible power supply 10 comprises the same function as that of the uninterruptible power supply 1 (see FIG. 7) explained above and a function of monitoring a schedule operation. A computer 40, a display 41, and a storage device 42 are connected to the uninterruptible power supply 10 as highly reliable loads through power supply lines $PL_1$ to $PL_3$.

Therefore, a stabilized voltage having a constant voltage/constant frequency is supplied to the computer 40, the display 41, and the storage device 42. The uninterruptible power supply 10 and the computer 40 are connected to each other through a communication line CL, and the computer 40, and the computer 40 is a computer terminal serving as a server and outputs a command and parameters (power supply stop time, power supply restart time, and schedule operation time) related to the schedule operation explained above or a remote command for designating stopping/restarting of power supply by a remote operation independently of the schedule operation. The display 41 is connected to the computer 40 to display an arithmetic operation result, various images, and the like. The storage device 42 is connected to the computer 40, and is a magnetic disk device, a photomagnetic disk device, or the like. The storage device 42 stores various data under the control of the computer 40.

Figure 2:
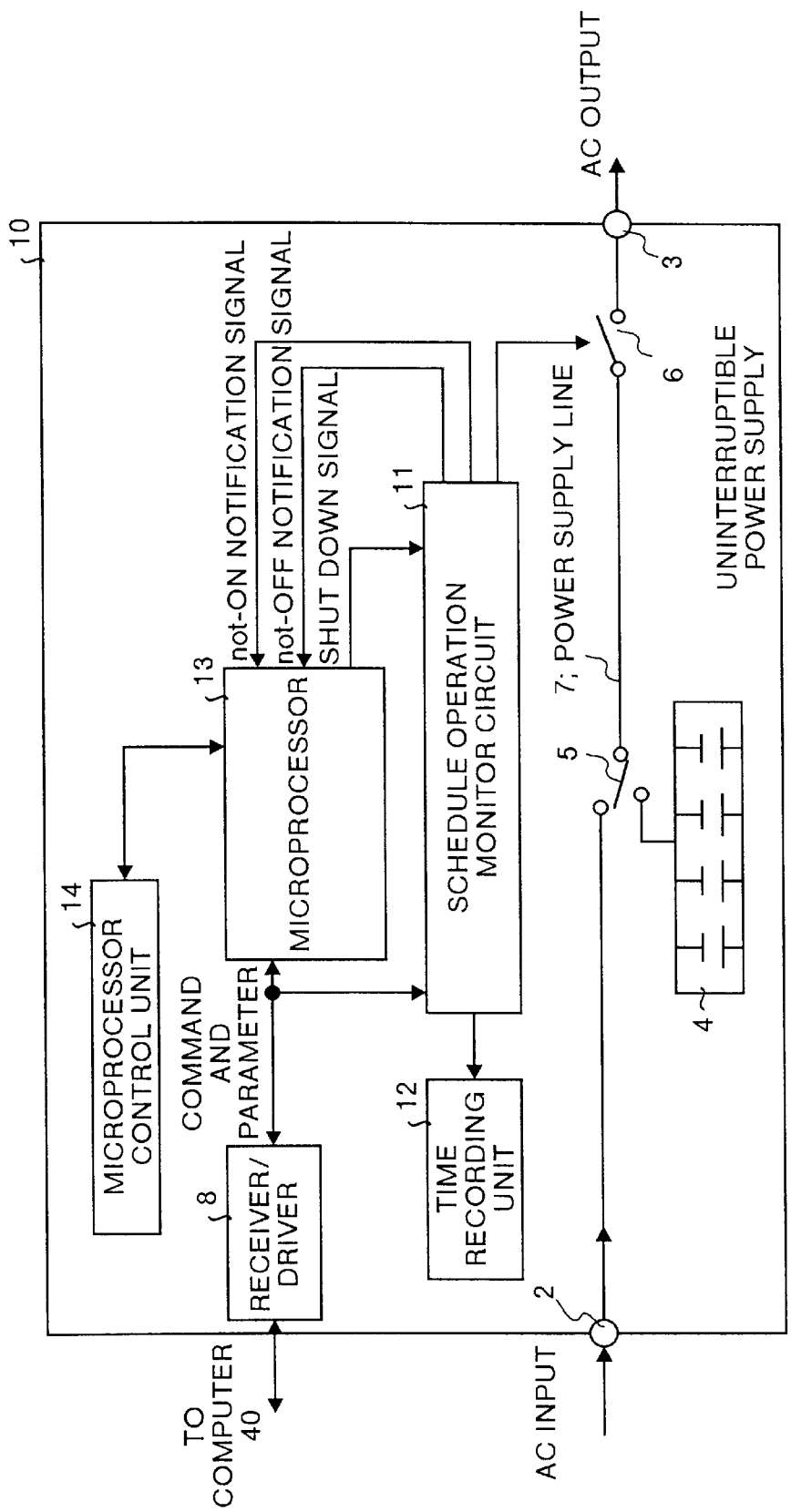
FIG. 2 is a block diagram showing an outline configuration of the uninterruptible power supply 10 shown in FIG. 1.

In this case, an outline configuration of the uninterruptible power supply 10 will be described below with reference to FIG. 2. The same reference numerals as in FIG. 7 denote the corresponding parts in FIG. 2, and a description thereof will be omitted. In FIG. 2, a schedule operation monitor circuit 11, a time recording unit 12, and a microprocessor control unit 14 are newly arranged, and a microprocessor 13 is arranged in place of the microprocessor 9 shown in FIG. 7.

A receiver/driver 8 receives a command and parameters related to a schedule operation (remote operation) which are output from the computer 40 through the communication line CL (see FIG. 1). These command and parameters are then input to the schedule operation monitor circuit 11 and the microprocessor 13. The schedule operation monitor circuit 11 monitors whether or not a schedule operation for automatically stopping/restarting power supply to the highly reliable loads (the computer 40, the display 41, and the storage device 42) is normally executed on the basis of the command, the parameters, and a shut down signal. More specifically, when the shut down signal for stopping power supply is not output from the microprocessor 13 after the power supply stop time passes, the schedule operation monitor circuit 11 recognizes this state as an abnormality to output a not-OFF notification signal to the microprocessor 13.

When outputting of the shut down signal is not stopped even if the power supply restart time passes in a stop of power supply, the schedule operation monitor circuit 11 recognizes this state as an abnormality to output a not-ON notifying signal to the microprocessor 13. In addition, in execution of the schedule operation, i.e., in a stop of power supply, when a schedule operation is stopped at time different from the power supply restart time obtained by the parameters, the schedule operation monitor circuit 11 recognizes this state as an abnormality to output data at abnormality occurrence time to the time recording unit 12. The detailed configuration of the schedule operation monitor circuit 11 will be explained below with reference to FIG. 3.

Here, the schedule operation monitor circuit 11 is not a circuit for monitoring an ON/OFF state of a power supply on the basis of a simple switch signal input from an external device of the uninterruptible power supply 10. The schedule operation monitor circuit 11 receives a command and parameters transmitted to execute a schedule operation independently of the microprocessor 13, and always monitors whether a schedule designated by the external computer 40 or the like is executed by the microprocessor 13 according to the contents of the schedule. In addition, the schedule operation monitor circuit 11 receives command and parameters related to the schedule in dependently of the microprocessor 13 to execute a monitor operation. Therefore, the schedule operation monitor circuit 11 can monitor the schedule operation without being adversely affected by a malfunction in operation of the microprocessor 13.

The time recording unit 12 is constituted by a memory/printer, and records (stores/prints out) data input by the schedule operation monitor circuit 11 at abnormality occurrence time. The microprocessor 13, like the microprocessor 9 (see FIG. 7), outputs/stops a shut down signal for ON/OFF-controlling the output switch 6 in a schedule operation (remote operation) according to the command and the parameters received from the receiver/driver 8. The details of an operation of the microprocessor 13 will be explained later.

The microprocessor control unit 14 is to control the microprocessor 13. When an abnormality that a stop of power supply in the schedule operation is not executed even if the power supply stop time passes occurs, i.e., when a not-OFF notification signal is input to the microprocessor 13, the microprocessor control unit 14 instructs the microprocessor 13 to forcibly output a shut down signal so as to perform automatic restoration.

Similarly, when an abnormality that outputting of the shut down signal is stopped even if the power supply restart time elapses in a stop of power supply occurs, i.e., when a not-ON notifying signal is input to the microprocessor 13, the microprocessor control unit 14 instructs the microprocessor 13 to forcibly stop outputting of the shut down signal so as to perform automatic restoration. In addition, the microprocessor control unit 14 has a function of recording an abnormal log representing that the abnormality occurs on a memory or a sheet of recording paper and a function of notifying an external device of the abnormal log.

Figure 3:
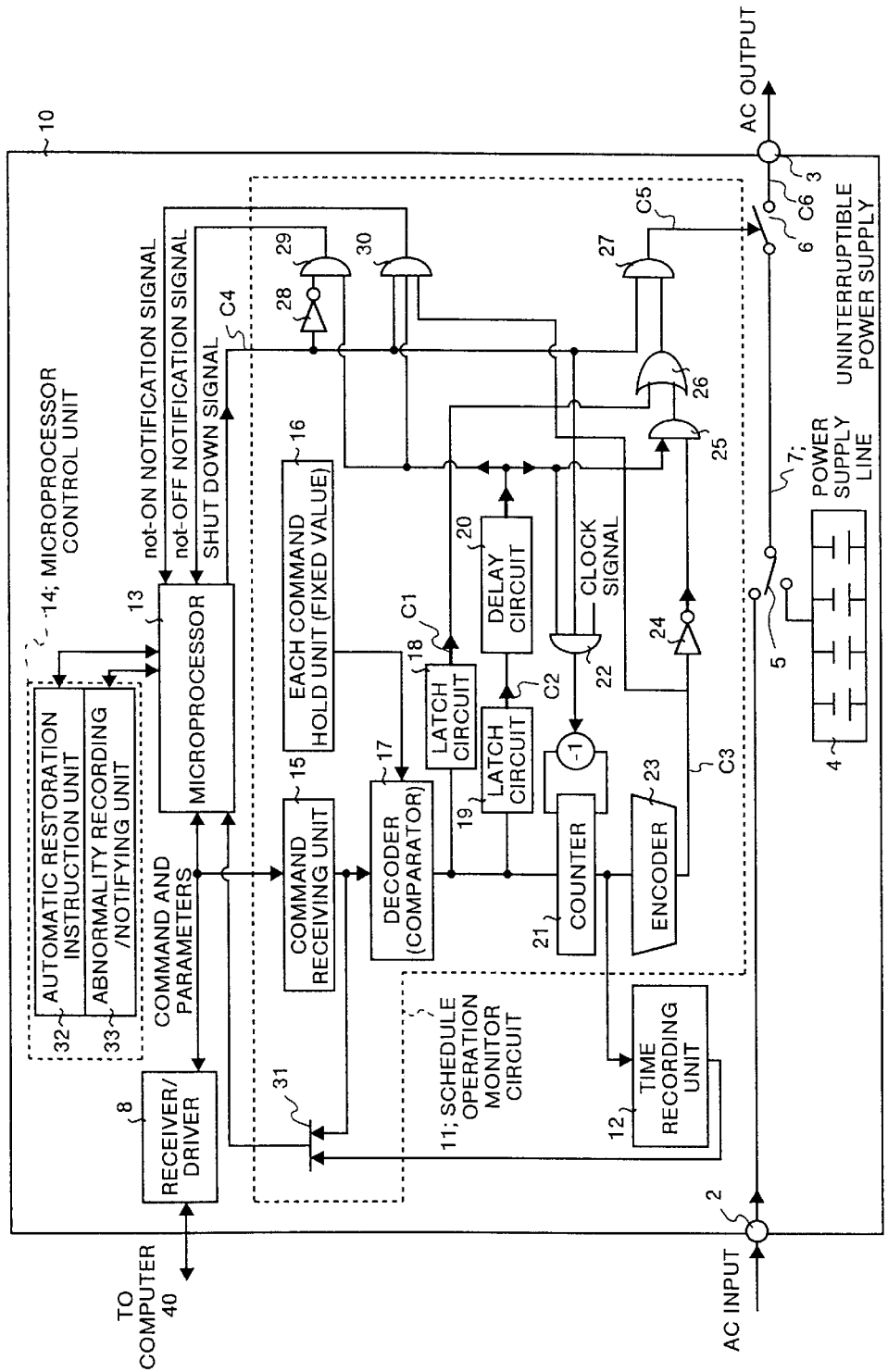
FIG. 3 is a block diagram showing a detailed configuration of the uninterruptible power supply 10 shown in FIG. 1.

The detailed configuration of the uninterruptible power supply 10 described above will be described below with reference to FIG. 3. The same reference numerals as in FIG. 2 denote the corresponding parts in FIG. 2. In FIG. 3, detailed configurations of the schedule operation monitor circuit 11 and the microprocessor control unit 14 are illustrated. In the schedule operation monitor circuit 11, the command receiving unit 15 receives and holds a command and parameters output from the receiver/driver 8 independently to the microprocessor 13. At the same time, the microprocessor 13 also receives the command and the parameters as inputs. Command holding units 16 holds commands concerning a schedule operation, a remote command, and the like as fixed values beforehand. This remote command is a command for ON/OFF-controlling the output switch 6 by a remote operation to the computer 40 independently of the schedule operation.

A decoder 17 compares the command concerning the schedule operation received from the command receiving unit 15 with the command held by each of the command holding units 16. If both the command coincides with each other, the decoder 17 decodes schedule operation time (power supply restart time-power supply stop time) from the parameters. The decoder 17 then sets the schedule operation time as an initial value in a counter 21, and latches "1" in a latch circuit 19. While the command related to the schedule operation is not received by the command receiving unit 15, the decoder 17 latches "0" in the latch circuit 19. The decoder 17 compares a remote command received by the command receiving unit 15 with the remote command held by each of the command holding units 16. If both the remote commands coincide with each other, the decoder 17 then latches "1" in a latch circuit 18. While no remote command is received by the command receiving unit 15, the decoder 17 latches "0" in the latch circuit 18.

A delay circuit 20 delays an output signal C2 from the latch circuit 19 by a predetermined time, and the delay time corresponding to a time required for a command process in the microprocessor 13. This output signal C2 is a signal of "1" or "0" which is latched in the latch circuit 19. The counter 21 is a subtraction counter for decrementing the initial value set with decoder 17 by one every time a subtraction pulse is input from an AND circuit 22. The AND circuit 22 is a three-input circuit which receives the output signal C2 delayed by the delay circuit 20, a shut down signal C4, and a clock signal having a predetermined frequency and generated by a not shown clock generator.

Here, the condition that an output signal from the AND circuit 22 becomes "1" is that all of the output signal C2, the shut down signal C4, and the clock signal are "1" (high level). In other words, the condition is that the following three conditions (1) to (3) are satisfied at once. That is, (1) a command/parameters related to a schedule operation are received by the command receiving unit 15, and the decoder 17 latches "1" in the latch circuit 19; (2) the microprocessor 13 outputs the shut down signal C4 ("1" signal) to start a stop of power supply in a schedule operation; and (3) the clock signal becomes high level.

More specifically, the moment a stop of power supply is started in the schedule operation, a subtraction pulse synchronized with the cycle of the clock signal is output from the AND circuit 22 to the counter 21. The counter 21 then decrements the count value by one every time the subtraction pulse is input. Therefore, the count value of the counter 21 represents a time after the stop of power supply in the schedule operation is started, i.e., a time in which the schedule operation continues. The count value (time data) of the counter 21 is output to the time recording unit 12 every moment, and the time recording unit 12 performs a recording operation to store the count value (time data) in a memory or to print out the count value.

An encoder 23 encodes the count value of the counter 21. When this count value becomes "0", i.e., when it becomes power supply restart time at which a power supply stop period in the schedule operation is completed, a output signal C3 from the encoder 23 is set to be "1". On the other hand, in the power supply stop period, the output signal C3 from the encoder 23 is set to be "0". An inverter circuit 24 inverts the output signal C3. An AND circuit 25 is a two-input circuit, and receives an output signal from the inverter circuit 24 and the output signal C2 as inputs. An OR circuit 26 is a two-input circuit, and receives an output signal from the AND circuit 25 and an output signal C1 as inputs. An AND circuit 27 is a two-input circuit, and receives an output signal from the OR circuit 26 and the shut down signal C4 as inputs.

An output signal C5 from the AND circuit 27 is a signal for ON/OFF-controlling the output switch 6. More specifically, when the output signal C5 is "0", the output switch 6 is turned on, and an output C6 from the uninterruptible power supply 10 is turned on (power supply state). On the other hand, when the output signal CS is "1", the output switch 6 is turned off to turn off (power supply stop state) the output C6 from the uninterruptible power supply 10. An inverter circuit 28 inverts the shut down signal C4. An AND circuit 29 is a two-input circuit, and receives an output signal from the inverter circuit 28 and the output signal C2 as inputs.

An output signal from the AND circuit 29 is a signal for notifying the microprocessor 13 whether a stop of power supply is normally performed at the power supply stop time in a schedule operation. More specifically, when both the output signal C2 and the shut down signal C4 are "1", in other words, when a stop of power supply is normally performed, the output signal from the AND circuit 29 becomes "0". On the other hand, when the output signal C2 is "1", and the shut down signal C4 is "0" (is not output), i.e., when an abnormality that a stop of power supply is not performed at the power supply stop time occurs, the output signal of the AND circuit 29 becomes "1", and this signal is output to the microprocessor 13 as a not-OFF notification signal.

An AND circuit 30 is a three-input circuit, and receives the shut down signal C4, the output signal C2, and the output signal C3 as inputs. An output signal from the AND circuit 30 is a signal for notifying the microprocessor 13 whether outputting of the shut down signal C4 is normally stopped at the power supply restart time on the basis of a schedule operation. More specifically, when both the output signal C2 and the output signal C3 are "1", and when the shut down signal C4 changes from "1" to "0", in other words, when restarting of power supply is normally performed, the output signal from the AND circuit 30 becomes "0".

On the other hand, although both the output signal C2 and the output signal C3 are "1", when the shut down signal C4 is kept at "1", in other words, when an abnormality that outputting of the shut down signal C4 is not stopped at the power supply restart time occurs, the output signal of the AND circuit 30 becomes "1", and this signal is output to the microprocessor 13 as a not-ON notifying signal.

A comparator 31 outputs a count value (abnormality occurrence time) held by the time recording unit 12 and a command/parameters held by the command receiving unit 15 to the computer 40 (or an external device) through the microprocessor 13, the receiver/driver 8, and the communication line CL (see FIG. 1).

In the microprocessor control unit 14, after the command and the parameters related to the schedule operation are received by the microprocessor 13, when the not-OFF notification signal is input to the microprocessor 13, the automatic restoration instruction unit 32 recognizes that the not-OFF notification signal is input to the microprocessor 13, and instructs the microprocessor 13 to forcibly output the shut down signal C4 ("1"). Further, when a not-ON notifying signal is input to the microprocessor 13, the automatic restoration instruction unit 32 recognizes that the not-ON notifying signal is input to the microprocessor 13, and instructs the microprocessor 13 to forcibly stop outputting of the shut down signal C4.

After the command and the parameters related to the schedule operation are received by the microprocessor 13, when a not-OFF notification signal is input to the microprocessor 13, the abnormality recording/notifying unit 33 records or prints out an effect representing that an abnormality that no shut down signal C4 is output at the power supply stop time occurs, an effect representing that automatic restoration (forcible outputting of the shut down signal C4) is performed by the automatic restoration instruction unit 32 as an action against occurrence of the abnormality, abnormality occurrence time, and a command/parameters at this time on a memory as abnormal logs.

Similarly, when a not-ON notifying signal is input to the microprocessor 13, the abnormality recording/notifying unit 33 records or prints out an effect representing that an abnormality that outputting of the shut down signal C4 is not stopped at the power supply restart time occurs, an effect representing that automatic restoration (forcible stopping of outputting of the shut down signal C4) is performed by the automatic restoration instruction unit 32 as an action against occurrence of the abnormality, abnormality occurrence time, and a command/parameters at this time on a memory as abnormal logs. Further, the abnormality recording/notifying unit 33 also has a function of outputting the data of the abnormal logs described above to the computer 40 (or an external device) through the microprocessor 13, the receiver/driver 8, and the communication line CL (see FIG. 1) for the trouble.

Figure 5:
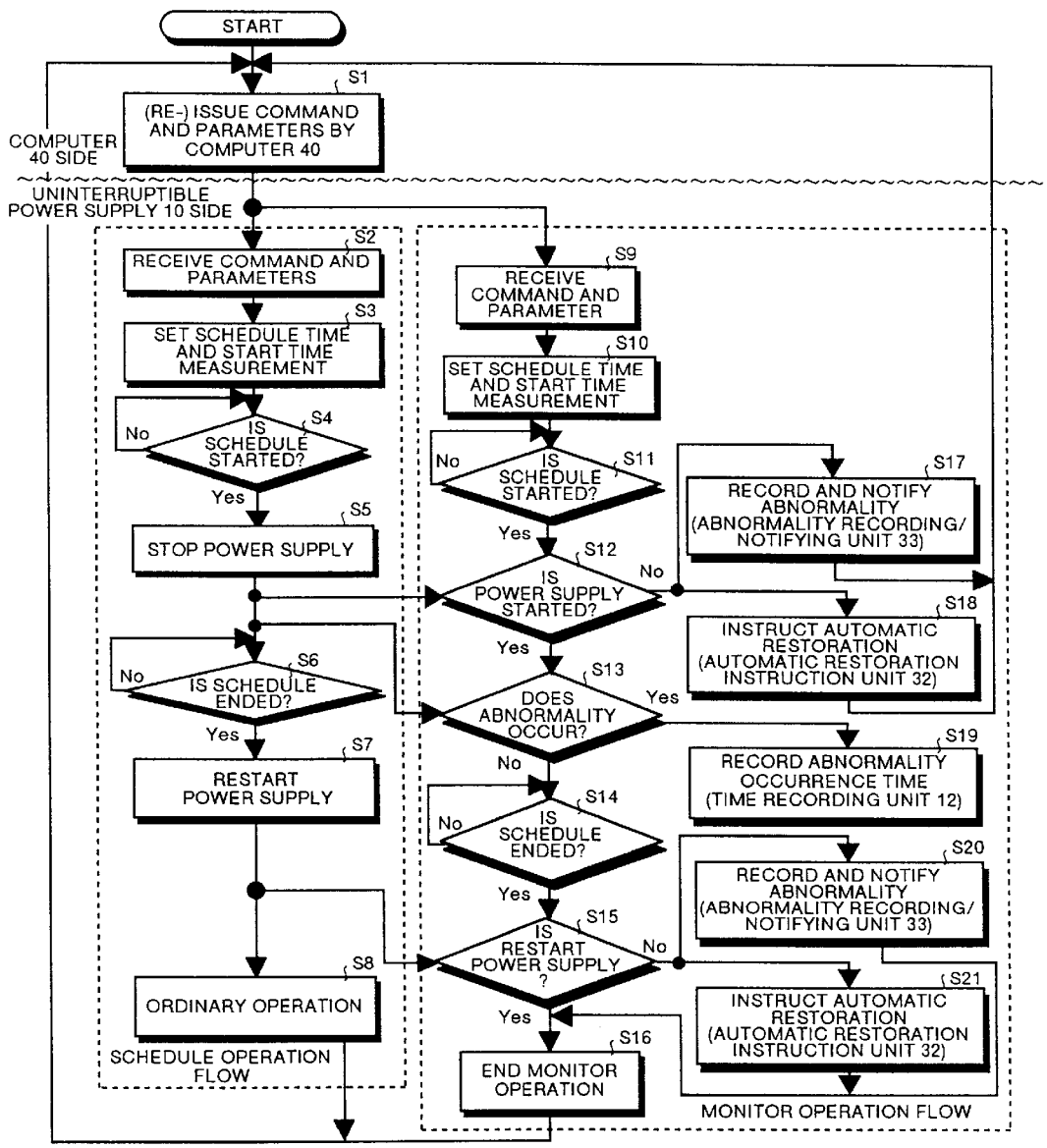
FIG. 5 is a flow chart showing an operation of the uninterruptible power supply 10 according to the first embodiment of the present invention.

An operation of the uninterruptible power supply 10 according to the first embodiment will be explained below with reference to FIG. 4 and FIG. 5. FIG. 4 shows a truth table of the output signals C1 to C3, the shut down signal C4, the output signal C5, and the output C6 shown in FIG. 3. FIG. 5 is a flow chart for explaining a schedule operation and a monitor operation in the uninterruptible power supply 10.

(Normal Operation)

An operation in a normal case will be explained below with reference to FIG. 3 and FIG. 4 (1 to 4) to understand easily the schedule operation and the monitor operation. In normal case, the microprocessor 13 and the command receiving unit 15 shown in FIG. 3 receive a command and parameters concerning the schedule operation. In this case, since all the output signals C1 to C3, the shut down signal C4, and the output signal C5 shown in FIG. 3 become "0" as indicated by 1 in FIG. 4, the output C6 is turned on by turning on the output switch 6. Therefore, a stabilized voltage having a constant voltage/constant frequency and obtained by shaping a commercial AC voltage input to the power supply input unit 2 is supplied from the power supply output unit 3 to the computer 40, the display 41, and the storage device 42 through the power supply lines $PL_1$ to $PL_3$ (see FIG. 1).

Here, in the ordinary operation, although the shut down operation signal C4 indicated by 2 in FIG. 4 must be "0" in a normal state, when the shut down signal C4 is "1", "abnormal shut down signal" is determined. Similarly, in the ordinary operation, although the output signal C3 must be "0" in a normal state as indicated by ③ in FIG. 4, when the output signal C3 is "1", "abnormal counter" is determined. Further, although the output signal C3 and the shut down signal C4 must be "0" in a normal state as indicated by ④ by in FIG. 4, when the output signal C3 and the shut down signal C4 are "1", "abnormal decoder signal" is determined. When these "abnormal shut down signal", "abnormal counter", and "abnormal decoder signal" are occurred, after a not shown alarm unit detects these abnormalities, alarm is sounded as minor alarm. Here, the minor alarm is used for the following reason. Since the output C6 is set in an ON state even if the abnormalities 2 to 4 in FIG. 4 occur, power supply to the computer 40 or the like is not adversely affected.

(Schedule Operation and Monitor Operation)

A schedule operation and a monitor operation will be described below with reference to FIG. 4 (5 to 8) and FIG. 5. In FIG. 5, step S1 is a step on the computer 40 side. Step S2 to step S8 indicate a schedule operation in the microprocessor 13, and step S9 to step S21 indicate a monitor operation in the schedule operation monitor circuit 11, the time recording unit 12, and the microprocessor control unit 14.

When the schedule operation is to be performed, in step S1 in FIG. 5, the computer 40 issues a command and parameters (power supply stop time, power supply restart time, and schedule operation time) concerning the schedule operation. These command and parameters are received by the receiver/driver 8 shown in FIG. 3 through the communication line CL. In this manner, in step S2, the microprocessor 13 receives the command and the parameters, and then the microprocessor 13 proceeds to step S3.

In step S3, the microprocessor 13 sets a schedule operation time on the basis of the received parameters and measurement time by a not shown timer is started, and then the microprocessor 13 proceeds to step S4. In step S4, the microprocessor 13 monitors whether a time measurement result of the timer becomes the power supply stop time to determine whether the schedule (power supply stop) is started. If the result of determination is "NO", the microprocessor 13 repeats this determination.

On the other hand, in parallel to step S2 to step S4 explained above, in the schedule operation monitor circuit 11 and the microprocessor control unit 14, processes in step S9 to step S11 are executed. More specifically, in step S9, the command receiving unit 15 receives the command and the parameters concerning the schedule operation. In this manner, the decoder 17 compares the command with a command held by each of the command holding units 16. In this case, since both the commands coincide with each other, the decoder 17 latches "1" in the latch circuit 19, and then decodes the parameters to set a schedule operation time in the counter 21 as an initial value.

Here, the command and the parameters concerning the schedule operation and received by the command receiving unit 15 in step S9 are held by the command receiving unit 15 even if it is in the schedule operation. Therefore, when fault analysis or the like is executed after a malfunction occurs in the schedule operation, the command and the parameters held by the command receiving unit 15 are read to the computer 40 (or an external device) as the record of communication between the uninterruptible power supply 10 and the computer 40.

Further, on the monitor side, in step S10, the automatic restoration instruction unit 32 of the microprocessor control unit 14 sets a schedule operation time independently of the microprocessor 13 on the basis of the parameters received by the microprocessor 13. The automatic restoration instruction unit 32 then starts time measurement by a timer (not shown), and proceeds to step S11. In step S1, the automatic restoration instruction unit 32 monitors whether a time measurement result of the timer is power supply stop time to determine whether the schedule (power supply stop) is started. If the result of determination is "NO", the automatic restoration instruction unit 32 repeats this determination.

When the time measurement results of the timers of the microprocessor 13 and the automatic restoration instruction unit 32 are the power supply stop time, the microprocessor 13 and the automatic restoration instruction unit 32 set the results of determinations to be "YES" in step S4 and step S11, respectively, and proceeds to step S5 and step S12, respectively. In step S5, in order to perform a power supply stop operation, the microprocessor 13 outputs a shut down signal C4 having a value of "1". In this manner, as indicated by ⑥ in FIG. 4, since the output signal C1="0", the output signal C2="1", the output signal C3="0", and the shut down signal C4="1" are satisfied, when the output signal C5 is "1", the output switch 6 is turned off (output C6=OFF). Therefore, in this case, power supply to the computer 40 or the like is stopped at the power supply stop time according to a preset schedule.

When the shut down signal C4(="1") is output from the microprocessor 13, subtraction pulses are sequentially input from the AND circuit 22 to the counter 21 in synchronism with the cycle of a clock signal. In this manner, the counter 21 decrements the count value (schedule operation time) by one every time the subtraction pulse is input, and the time recording unit 12 records the count value every moment.

In parallel to step S4 described above, in step S11, when the time measurement result of the timer is power supply stop time, the automatic restoration instruction unit 32 sets the check result to be "YES", and shifts to step S12. In step S12, the automatic restoration instruction unit 32 checks whether a stop of power supply is normally performed at the power supply stop time on the basis of whether a not-OFF notification signal is input from the AND circuit 29 to the microprocessor 13. In this case, as indicated by ⑥ in FIG. 4, since the output signal C2="1" and the shut down signal C4="1" are satisfied, the not-OFF notification signal is not output from the AND circuit 29. In this case, the automatic restoration instruction unit 32 sets the result of determination in step S12 to be "YES", and proceeds to step S13.

Here, in step S5, an operation which is performed when the shut down signal C4(="1") is not output because an abnormality occurs in the microprocessor 13 after the power supply stop time passes will be explained below. In this case, as indicated by 5 in FIG. 4, since the output signal C2="1" and the shut down signal C4="0" are satisfied, an output signal from the AND circuit 29 is "1". Therefore, a not-OFF notification signal is output from the AND circuit 29 to the microprocessor 13. In this manner, the automatic restoration instruction unit 32 sets the result of determination in step S12 to be "NO", and shifts to step S17. In step S18, the automatic restoration instruction unit 32 recognizes that an abnormality (not-OFF abnormality) occurs, and an instruction of automatic restoration is performed to the microprocessor 13 such that the shut down signal C4="1" is forcibly output.

In parallel to the above operation, in step S17, the abnormality recording/notifying unit 33 records, as abnormal logs, the fact of the not-OFF abnormality occurrence, the fact of the action of the automatic restoration, occurrence time of the not-OFF abnormality, and a command/parameters on a memory. In addition, the abnormality recording/notifying unit 33 notifies the computer 40 through the microprocessor 13, the receiver/driver 8, and the communication line CL (see FIG. 1), so as to reissue these abnormal logs, the command, and the parameters, issued in advance. In this manner, the reissued command and parameters are received to the microprocessor 13 by the same operation as explained above. In the following operation, the schedule operation continues on the basis of the command and the parameters. In step S17, only notifying of the abnormal logs, it is also possible the microprocessor 13 to proceed may shift to step S13 without receiving the reissued command and the reissued parameters.

When the microprocessor 13 receives the notification of the automatic restoration from the automatic restoration instruction unit 32, the microprocessor 13 forcibly outputs the shut down signal C4="1". In this manner, as indicated by ⑥ in FIG. 4, the output switch 6 is turned off by forcibly changing the output signal C5 from "0" to "1", automatic restoration (forcible power supply stop) is performed. Further, since the shut down signal C4 is forcibly set to be "1", outputting of the not-OFF notification signal from the AND circuit 29 is stopped. Therefore, the automatic restoration instruction unit 32 sets the result of determination in step S12 to be "YES".

In step S13, the schedule operation monitor circuit 11 checks whether an abnormality occurs during the schedule operation. That is, the schedule operation monitor circuit 11 determines whether an abnormality that outputting of the shut down signal C4 is stopped by a malfunction of the microprocessor 13 before the power supply restart time occurs. More specifically, during the schedule operation, if outputting of the shut down signal C4(="1") of the microprocessor 13 is stopped by the malfunction, outputting of subtraction pulses from the AND circuit 22 is stopped to stop decrement in the counter 21.

In this case, the count value of the counter 21 is not 0. Therefore, since the output signal C3="0" and the shut down signal C4="0" are satisfied, the output signal C5 changes from "1" to "0", and an abnormality that power supply is restarted before the power supply restart time occurs. When such an abnormality occurs, the result of determination in step S13 is "YES", and the count value (abnormality occurrence time) of the counter 21 is recorded on the time recording unit 12 in step 19.

If that no abnormality occurs in step S13, the automatic restoration instruction unit 32 of the microprocessor control unit 14 monitors, in step 14, whether the time measurement result of the timer is the power supply restart time to determine whether the schedule is ended. If the result of determination is "NO", the automatic restoration instruction unit 32 then repeats this determination. In parallel to step S13, the microprocessor 13 monitors, in step S6, independently of the automatic restoration instruction unit 32, whether the time measurement result of the timer is the power supply restart time to determine whether the schedule is ended. If the result of determination is "NO", the microprocessor 13 then repeats this determination.

When the time measurement results of the timers of the microprocessor 13 and the automatic restoration instruction unit 32 are the power supply restart time, the microprocessor 13 and the automatic restoration instruction unit 32 set the results of determinations to be "YES" in step S6 and step S14, respectively, and proceed to step S7 and step S15, respectively. In step S7, in order to perform a power supply restart operation, the microprocessor 13 stops outputting of the shut down signal C4. In this manner, as indicated by ⑦ in FIG. 4, since the output signal C1="0", the output signal C2="1", the output signal C3="0", and the shut down signal C4="1" are satisfied, when the output signal C5 is "0", the output switch 6 is turned on (output C6=ON). Therefore, in this case, power supply to the computer 40 or the like is restarted at the power supply restart time according to a preset schedule, the ordinary operation state (step S8) is set. Subsequently, the schedule operation is performed every time a command and parameters concerning the next schedule operation are issued.

When outputting of the shut down signal C4 from the microprocessor 13 is stopped, outputting of subtraction pulses from the AND circuit 22 is stopped, and the count operation of the counter 21 is stopped. At this time, the operation is performed according to the schedule, the count value of the counter 21 is "0". Therefore, the output signal C3 of the encoder 23 changes from "0" to "1".

In parallel to step S6 described above, in step S14, when the time measurement result of the timer is the power supply restart time, the automatic restoration instruction unit 32 sets the result of determination to be "YES", and proceeds to step S15. In step S15, on the basis of whether a not-ON notification signal is input from the AND circuit 30 to the microprocessor 13, the automatic restoration instruction unit 32 determines whether power supply is normally restarted at the power supply restart time, in other words, whether outputting of the shut down signal C4 is normally stopped. In this case, as indicated by ⑦ in FIG. 4, since the output signal C2="1", the output signal C3="1", and the shut down signal C4="0" are satisfied, the not-ON notification signal is not output from the AND circuit 30. In this case, the automatic restoration instruction unit 32 sets the result of determination in step S15 to be "YES", proceeds to step S16, and ends the monitor operation. Subsequently, the monitor operation described above is performed every time a command and parameters concerning the next schedule operation are issued.

Here, in step S15, an operation performed when outputting of the shut down signal C4 is not performed because an abnormality occurs in the microprocessor 13 after the power supply restart time elapses will be explained below. In this case, as indicated by ⑧ in FIG. 4, since the output signal C2="1", the output signal C3="1", and the shut down signal C4="1" are satisfied, an output signal from the AND circuit 30 is "1". Therefore, a not-ON notification signal is output from the AND circuit 30 to the microprocessor 13. In this manner, the automatic restoration instruction unit 32 sets the result of determination in step S15 to be "NO", and proceeds to step S21. In step S21, the automatic restoration instruction unit 32 recognizes that an abnormality (not-ON abnormality) occurs, and an instruction of automatic restoration is performed to the microprocessor 13 such that outputting of the shut down signal C4 is forcibly stopped.

In parallel to the above operation, in step S20, the abnormality recording/notifying unit 33 records, as abnormal logs, the fact of the not-ON abnormality occurrence, the fact of the action of the automatic restoration, occurrence time of the not-ON abnormality, and a command/parameters on a memory. When the microprocessor 13 receives notification of the automatic restoration from the automatic restoration instruction unit 32, the microprocessor 13 forcibly stops outputting of the shut down signal C4. In this manner, as indicated by ⑦ in FIG. 4, the shut down signal C4 is forcibly changed from "1" to "0", so that the automatic restoration is performed. Further, since the shut down signal C4 is forcibly changed to "0", outputting of the not-ON notification signal from the AND circuit 30 is stopped. In this manner, at step S16, the monitor operation is ended.

When ON/OFF-control performed by a remote operation is to be performed independently of the schedule operation, a remote command is output from the computer 40. This remote command is received by the microprocessor 13 and the command receiving unit 15 through the receiver/driver 8. When the remote command designates a remote ON operation, the microprocessor 13 sets the shut down signal C4 to be "0" as indicated by ⑨ in FIG. 4. At the same time, the decoder 17 latches "1" in the latch circuit 18 because the remote command coincides with the remote command held by each of the command holding units 16. In this manner, the output signal C1 input to the AND circuit 27 becomes "1", and the shut down signal C4 is "0". Thus, the output signal C5 becomes "0". Therefore, in this case, by turning on the output switch 6, the output C6 is turned on.

On the other hand, when the remote command designates a remote OFF operation, the microprocessor 13 outputs the shut down signal C4="1" as indicated by ⑩ in FIG. 4, and the decoder 17 latches "1" in the latch circuit 18. In this manner, since the output signal C1 input to the AND circuit 27 becomes "1", and the shut down signal C4 becomes "1". Thus, the output signal C5 becomes "1". Therefore, in this case, by turning off the output switch 6, the output C6 is turned off.

In the action against the abnormality occurring in step S13 explained above, a command for correcting abnormal logs is received by the microprocessor 13 from the computer 40 through the communication line CL and the receiver/driver 8. In this manner, the microprocessor 13 corrects data of abnormality occurrence time from the time recording unit 12 and a command and parameters in occurrence of an abnormality from the command receiving unit 15 through the comparator 31, and then output them as abnormal logs to the computer 40. Further, in action against the abnormalities (not-OFF abnormality and not-ON abnormality) which occur in step S12 and step S15, when the microprocessor 13 outputs the command for correcting the abnormal logs, the microprocessor 13 records the abnormal logs recorded on the abnormality recording/notifying unit 33 to the computer 40. A customer engineer specifies an abnormal portion on the basis of the information of the abnormal logs described above, and performs appropriate treatment such as an exchange of parts, and reinstallation of the program.

As is described above, according to the uninterruptible power supply 10 of the first embodiment described above, when the shut down signal C4 is not output after the power supply stop time passes, and outputting of the shut down signal C4 is not stopped after the power supply restart time passes, automatic restoration is performed by the automatic restoration instruction unit 32. Thus, even if the abnormality (not-OFF abnormality or not-ON abnormality) occurs, a stop/restart of power supply can be performed to a highly reliable load such as the computer 40 according to the schedule. Therefore, a malfunction in the schedule operation can be canceled.

According to the uninterruptible power supply 10 of the first embodiment explained above, when the not-OFF abnormality and the not-ON abnormality occur, the fact of these abnormalities occurrence, the fact of the action of the automatic restoration, abnormality occurrence time, and a command/parameters at this time are recorded on the abnormality recording/notifying unit 33 as abnormal logs. Thus, on the basis of the abnormal logs, a customer engineer can easily know a command/parameters which cause these abnormalities or an action which is automatic restoration. Therefore, on the basis of these pieces of information (abnormal logs), the action against trouble can be rapidly made.

In addition, according to the uninterruptible power supply 10 of the first embodiment explained above, abnormality occurrence time in a schedule operation is recorded on the time recording unit 12, and a command and parameters are held by the command receiving unit 15 independently of the microprocessor 13. Therefore, in a countermeasure against the abnormality, the command, the parameters, and the abnormality occurrence time which are abnormal logs can be easily corrected. Thus, in comparison with a conventional device which does not have any information concerning abnormality occurrence in the schedule operation, an effective investigation of the cause and an appropriate treatment can be made on the basis of the abnormal logs. Therefore, the action against trouble can be rapidly made.

Figure 6:
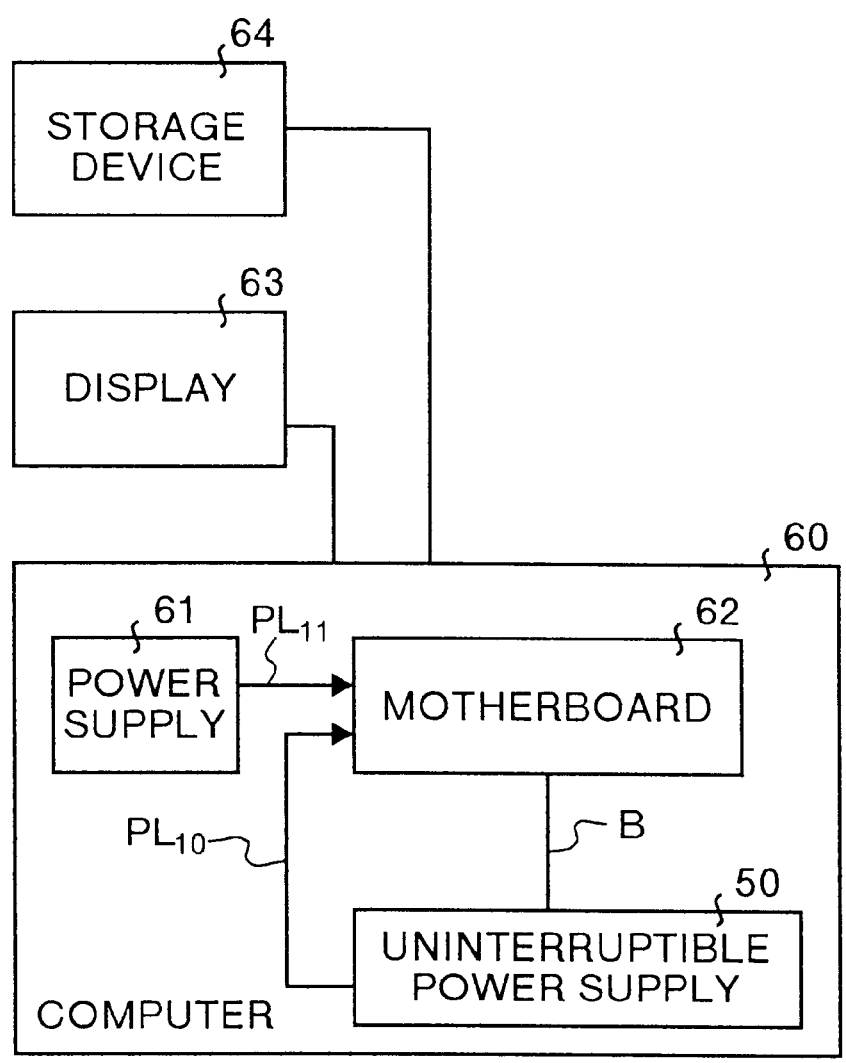
FIG. 6 is a block diagram showing an application of an uninterruptible power supply 50 according to a second embodiment of the present invention.

In the first embodiment explained above, the uninterruptible power supply 10 serving as an external device for a highly reliable load (computer 40 or the like) has been described above. However, the present invention is not limited to the first embodiment, and the present invention can be applied to an uninterruptible power supply which is built in a highly reliable load as explained in a second embodiment. FIG. 6 is a block diagram showing an application of an uninterruptible power supply 50 according to the second embodiment of the present invention. In FIG. 6, the uninterruptible power supply 50 is built in a computer 60 (e.g., a server) serving as a highly reliable load. The uninterruptible power supply 50 is not limited to a built-in type uninterruptible power supply, and a card type uninterruptible power supply which is inserted into a slot of the computer 60 may be used. The uninterruptible power supply 50 and the uninterruptible power supply 10 (see FIG. 1) are only different from each other in size, and have the same function.

In the computer 60, a power supply 61 is connected to a motherboard 62 through an internal power supply line $PL_{11}$. The uninterruptible power supply 50 is built in the computer 60, and is connected to a motherboard 62 through an internal power supply line $PL_{10}$. The uninterruptible power supply 50 supplies a stabilized voltage having a constant voltage/constant frequency to respective sections by the same manner as that in the uninterruptible power supply 10. The uninterruptible power supply 50 is connected to the motherboard 62 through an internal bus B, and receives the command and the parameters described above from a CPU (Central Processing Unit) mounted on the motherboard 62. The stabilized voltage is supplied to a display 63 and the storage device 64 through the motherboard 62. A schedule operation and a monitor operation in the uninterruptible power supply 50 are the same as those in the uninterruptible power supply 10 according to the first embodiment explained above. Therefore, according to the second embodiment, the same advantages as those in the first embodiment can be achieved.

Although the first and second embodiments of the present invention have been described above, the concrete configuration of the present invention is not limited to the first and second embodiments. A change in design is included in the present invention without departing from the spirit and scope of the present invention. For example, in Embodiments 1 and 2, the uninterruptible power supply has been described as an example. However, the present invention is applicable for any power supply (control) unit such as a power supply apparatus, a power supply control apparatus, and a power supply system, besides the uninterruptible power supply equipment, regardless of the presence of a constant voltage control.

As explained above, according to one aspect of this invention, in a power supply apparatus, the schedule operation monitor unit monitors whether an abnormality has occurred in a scheduled operation, and when it is detected that the abnormality has occurred the automatic restoration unit executes the schedule operation in place of the schedule operation control unit. Therefore, there is obtained an effect that, if an abnormality occurs, a malfunction in the schedule operation can be canceled without adversely affecting a load.

According to another aspect of this invention, in a power supply control apparatus, the schedule operation monitor unit monitors whether an abnormality has occurred in a scheduled operation, and when it is determined that the abnormality has occurred the automatic restoration unit executes the schedule operation in place of the schedule operation control unit. Therefore, there is obtained an effect that, if an abnormality occurs, a malfunction in the schedule operation can be canceled without adversely affecting a load.

According to still another aspect of this present invention, in a power supply apparatus, the schedule operation monitor unit monitors whether an abnormality has occurred in a scheduled operation, and when it is determined that the abnormality has occurred then an abnormal log is recorded on the recording unit. Thus, the abnormal log is extracted from the recording unit in an action against trouble after the abnormality occurs, and the cause for the abnormality can be investigated on the basis of the abnormal log. Therefore, there is obtained an effect that, the action against trouble can be rapidly made.

According to still another aspect of this present invention, in a power supply control apparatus, the schedule operation monitor unit monitors whether an abnormality has occurred in a scheduled operation, and when it is determined that the abnormality has occurred then an abnormal log is recorded on the recording unit. Thus, the abnormal log is extracted from the recording unit in an action against trouble after the abnormality occurs, and the cause for the abnormality can be investigated on the basis of the abnormal log. Therefore, there is obtained an effect that, the action against trouble can be rapidly made.

According to still another aspect of this present invention, in a schedule operation monitor control method, the schedule operation monitor step is provided in which it is monitored whether an abnormality has occurred in a scheduled operation, and when it is determined that the abnormality has occurred then the automatic restoration step of executing the schedule operation is executed in place of executing the schedule operation control step. Therefore, there is obtained an effect that, if an abnormality occurs, a malfunction in the schedule operation can be canceled without adversely affecting a load.

According to still another aspect of the present invention, in a schedule operation monitor control method, in a schedule operation monitor control method, the schedule operation monitor step is provided in which it is monitored whether an abnormality has occurred in a scheduled operation, and when it is determined that the abnormality has occurred then an abnormal log is recorded. Thus, in an action against trouble after the abnormality occurs, the cause for the abnormality can be investigated on the basis of the abnormal log. Therefore, there is obtained an effect that, the action against trouble can be rapidly made.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A power supply apparatus comprising:
    a power supply unit which supplies a power to a load;
    a schedule operation controller which obtains a preset schedule and automatically controls power supply to said load on the basis of a preset schedule;
    a schedule operation monitor which obtains said preset schedule independently of said schedule operation controller, monitors an operation state of said schedule operation controller in a schedule operation, and outputs a monitor result when an abnormality occurs in the schedule operation; and
    an automatic restoration unit which obtains said monitor result and executes the schedule operation in place of said schedule operation controller on the basis of a monitor result of said schedule operation monitor when an abnormality occurs in the schedule operation.

2. The power supply apparatus according to claim 1, comprising a recording unit which records, when an abnormality occurs in the schedule operation, the abnormal log on the basis of a monitor result of said schedule operation monitor.

3. The power supply apparatus according to claim 1, comprising a holding unit which holds data concerning the schedule.

4. A power supply control apparatus for controlling a power supply apparatus for supplying a power to a load, said power supply control apparatus comprising:
    a schedule operation controller which obtains a preset schedule and automatically controls power supply to said load on the basis of a preset schedule;
    a schedule operation monitor which obtains said preset schedule independently of said schedule operation controller, monitors an operation state of said schedule operation controller in a schedule operation, and outputs a monitor result when an abnormality occurs in the schedule operation; and
    an automatic restoration unit which obtains said monitor result and executes the schedule operation in place of said schedule operation controller on the basis of a monitor result of said schedule operation monitor when an abnormality occurs in the schedule operation.

5. The power supply control apparatus according to claim 4, comprising a recording unit which records, when an abnormality occurs in the schedule operation, the abnormal log on the basis of a monitor result of said schedule operation monitor.

6. The power supply control apparatus according to claim 4, comprising a holding unit which holds data concerning the schedule.

7. A power supply apparatus comprising:
    a power supply unit which supplies a power to a load;
    a schedule operation controller which obtains a preset schedule and automatically controls power supply to said load on the basis of a preset schedule;
    a schedule operation monitor which obtains said preset schedule independently of said schedule operation controller, monitors an operation state of said schedule operation controller in a schedule operation, and outputs a monitor result when an abnormality occurs in the schedule operation; and
    a recording unit which obtains said monitor result and records, when an abnormality occurs in the schedule operation, the abnormal log on the basis of a monitor result of said schedule operation monitor.

8. The power supply apparatus according to claim 7, comprising a holding unit which holds data concerning the schedule.

9. A power supply control apparatus for controlling a power supply apparatus for supplying a power to a load, said power supply control apparatus comprising:
    a schedule operation controller which obtains a preset schedule and automatically controls power supply to said load on the basis of a preset schedule;
    a schedule operation monitor which obtains said preset schedule independently of said schedule operation controller, monitors an operation state of said schedule operation controller in a schedule operation, and outputs a monitor result when an abnormality occurs in the schedule operation; and a recording unit which obtains said monitor result and records, when an abnormality occurs in the schedule operation, the abnormal log on the basis of a monitor result of said schedule operation monitor.

10. The power supply control apparatus according to claim 9, comprising a holding unit which holds data concerning the schedule.

11. A schedule operation monitor control method applied to a power supply system for supplying a power to a load, comprising:

retrieving a preset schedule and automatically controlling a power supply to said load on the basis of the preset schedule;

obtaining, in a schedule operation, said preset schedule independently of retrieving the preset schedule and automatically controlling the power supply, monitoring an operation state of said retrieving the preset schedule and automatically controlling the power supply, and outputting a monitor result when an abnormality occurs in the schedule operation; and obtaining said monitor result and executing the schedule operation in place of the retrieving the preset schedule and automatically controlling the power supply on the basis of the monitor result when an abnormality occurs in the schedule operation.

12. A schedule operation monitor control method applied to a power supply system for supplying a power to a load, comprising:

retrieving a preset schedule and automatically controlling a power supply to said load on the basis of a preset schedule;

obtaining, in a schedule operation, said preset schedule independently of retrieving the preset schedule and automatically controlling the power supply, monitoring an operation state of said retrieving the preset schedule and automatically controlling the power supply, and outputting a monitor result when an abnormality occurs in the schedule operation; and obtaining said monitor result and recording, when an abnormality occurs in the schedule operation, the abnormal log on the basis of the monitor result.

13. A power supply control apparatus for controlling a power supply apparatus for supplying a power to a load, said power supply control apparatus comprising:

a schedule operation controller that obtains a preset schedule and automatically controls a power supply to said load on a basis of a preset schedule; and a schedule operation backup system that obtains said preset schedule independently of said schedule operation controller, monitors an operation state of said schedule operation controller in a schedule operation, and when an abnormality occurs in the schedule operation, executes the schedule operation in place of the schedule operation controller.

* * * * *